United States Patent [19]
Jones

[11] Patent Number: 5,226,211
[45] Date of Patent: Jul. 13, 1993

[54] PRECISION GUIDED TRANSFER FIXTURE

[75] Inventor: Joel W. Jones, Windsor, Canada

[73] Assignee: Tri-Way Machine Ltd., Windsor, Canada

[21] Appl. No.: 926,220

[22] Filed: Aug. 4, 1992

[51] Int. Cl.⁵ .............................................. B23Q 7/00
[52] U.S. Cl. ...................................... 29/559; 29/56.6; 29/711; 269/305; 269/310
[58] Field of Search ............. 29/709, 711, 714, 888.09, 29/559, 56.6; 269/305, 309, 310, 73, 25, 155

[56] References Cited

U.S. PATENT DOCUMENTS

| | | | |
|---|---|---|---|
| 2,699,708 | 1/1955 | Fotsch | 269/310 |
| 4,058,885 | 11/1977 | Bergman | 29/559 |
| 4,408,380 | 10/1985 | Schaper et al. | 29/559 X |
| 4,586,702 | 5/1986 | Chambers | 269/310 |
| 4,669,161 | 6/1987 | Sekelsky, Jr. | 269/25 X |
| 4,775,135 | 10/1988 | Leibinger et al. | 269/305 X |
| 4,794,687 | 1/1989 | Peters et al. | 29/559 |
| 4,832,325 | 5/1989 | Okolischan et al. | 269/305 |
| 4,880,220 | 11/1989 | Büchler | 269/309 X |
| 4,896,086 | 1/1990 | Miyahara et al. | 269/309 X |
| 4,901,990 | 2/1990 | Frechette | 269/25 |

FOREIGN PATENT DOCUMENTS

| | | | |
|---|---|---|---|
| 811918 | 4/1937 | France | 269/305 |
| 1298059 | 3/1987 | U.S.S.R. | 269/155 |

Primary Examiner—Mark Rosenbaum
Assistant Examiner—C. Martin
Attorney, Agent, or Firm—Shoemaker and Mattare, Ltd.

[57] ABSTRACT

A combination of a workpiece support means and a workstation allow a workpiece to be positioned for machining. The support includes a precision way and a transfer fixture slidable along the way. The transfer fixture has precision ground datum markers for locating a workpiece in the vertical sense, and supports means providing an upright surface against which the workpiece can be urged, thus establishing for the workpiece a limit position in one horizontal direction. Locator devices are provided to clamp the workpiece into a predetermined position in the horizontal direction at right angles to the direction established by the upright surface, and a transfer bar or the like moves the transfer fixture. At the workstation there is provided a clamping device for urging the workpiece downwardly against the datum markers, a further clamping device for urging the workpiece firmly against the upright surface, and a third clamping device for clamping the transfer fixture against the precision way.

12 Claims, 7 Drawing Sheets 5,226,211

PRECISION GUIDED TRANSFER FIXTURE

This invention relates generally to automated transfer systems for the high volume production machining of small components.

BACKGROUND OF THE INVENTION

For the high volume production machining of small components, the typical equipment used to accomplish the task of multi-station transfer machines, where at each work station a particular machining operation is performed. For example, typical stations will drill, ream, tap (etc.) one or several holes in each workpiece. The workpieces must be transferred into and out of each successive workstation.

For the transfer of the workpieces, the conventional methods include:

A. the use of pallets transferred between workstations, pallets being large fixtures onto which the workpieces are securely clamped before machining;

B. the use of a free transfer system without pellets, i.e. transferring only the workpieces into and out of a stationary work fixture.

Serious difficulties arise with the use of either the above-described conventional methods, when these are employed to transfer small and difficult to handle components. With the pallet method, a typical pallet can weigh up to 1200 pounds, thus dwarfing the weight of small components such as connecting rods. Where several stations are encountered, the method becomes unattractive from a cost point of view, considering the size and rigidity of the transfer mechanism, pallet clamping registries and the pallet return system.

The free transfer system is well known for the tendency of workpieces to fall out of the transfer mechanism and jam the equipment.

GENERAL DESCRIPTION OF THIS INVENTION

In view of the disadvantages of the conventional approaches described above, it is an object of one aspect of this invention to provide a precision guided transfer fixture and system operating on the principle that workpieces can be located accurately at a load station on all three datum planes, using minimum clamp forces generated by the travelling fixture itself, whereas at the workstation the workpiece is hydraulically clamped and jacked by a stationary, external fixture to withstand tooling forces.

It is an object of a further aspect of this invention to provide reliable means for transferring workpieces including the provision of a transfer fixture which is relatively light in weight compared to a typical pallet fixture.

More particularly, this invention provides, for use in positioning a workpiece for machining, the combination of a workpiece support means and a workstation, the workpiece support means comprising:

a) an elongate precision way mounted in a fixed position, b) a transfer fixture supported on and slidable along said precision way, the transfer fixture having an upper surface, c) a plurality of precision-ground datum markers integral with and projecting upwardly from said surface, the datum markers being adapted to contact predetermined locations on said workpiece, thus supporting the workpiece at a desired vertical position with respect to the transfer fixture, d) rail means fixed with respect to the transfer fixture, the rail means providing upright surfaces against which the workpiece can be urged, thus establishing for the workpiece a limit position in one horizontal direction, e) a fixed locator means and a movable locator means, the two locator means being mounted to said transfer fixture and being generally aligned in a horizontal direction perpendicular to said one horizontal direction, the movable locator means being resiliently biased toward the fixed locator means, the two locator means being adapted to clamp the workpiece between them with the movable locator means urging the workpiece against the fixed locator means, f) and motive means for moving the transfer fixture along the precision way;

the workstation comprising:

g) first clamping means for urging the workpiece downwardly against said datum markers, h) second clamping means for urging the workpiece in said one horizontal direction against the upright surfaces of said rail means, and i) third clamping means for clamping the transfer fixture against said precision way.

Further, this invention provides a method of positioning a workpiece for machining, the method including the steps:

A. providing a workpiece support means comprising:

a) an elongate precision way mounted in a fixed position, b) a transfer fixture supported on and slidable along said precision way, the transfer fixture having an upper surface, c) a plurality of precision-ground datum markers integral with and projecting upwardly from said surface, the datum markers being adapted to contact predetermined locations on said workpiece, thus supporting the workpiece at a desired vertical position with respect to the transfer fixture, d) rail means fixed with respect to the transfer fixture, the rail means providing upright surfaces against which the workpiece can be urged, thus establishing for the workpiece a limit position in one horizontal direction, e) a fixed locator means and a movable locator means, the two locator means being mounted to said transfer fixture and being generally aligned in a horizontal direction perpendicular to said one horizontal direction, the movable locator means being resiliently biased toward the fixed locator means, the two locator means being adapted to clamp the workpiece between them with the movable locator means urging the workpiece against the fixed locator means, f) and motive means for moving the transfer fixture along the precision way;

B. providing a workstation comprising:

g) first clamping means for urging the workpiece downwardly against said datum markers, h) second clamping means for urging the workpiece in said one horizontal direction against the upright surfaces of said rail means, and i) third clamping means for clamping the transfer fixture against said precision way;

C. placing the workpiece on the transfer fixture so that it rests on said datum markers and against said upright surface, D. using the movable and the fixed locator means to position the workpiece in the horizontal direction perpendicular to said one horizontal direction, E. moving the transfer fixture along said precision way until it reaches a predetermined position with respect to the workstation, F. clamping the transfer fixture against the precision way using said third clamping means, and then, in any order, G. urging the workpiece against said upright surfaces using said second clamping means, and H. urging the workpiece downwardly against said datum markers using said first clamping means.

GENERAL DESCRIPTION OF THE DRAWINGS

Two embodiments of this invention are illustrated in the accompanying drawings, in which like numerals denote like parts throughout the several views, and in which.

DETAILED DESCRIPTION OF THE DRAWINGS

Figure 1:
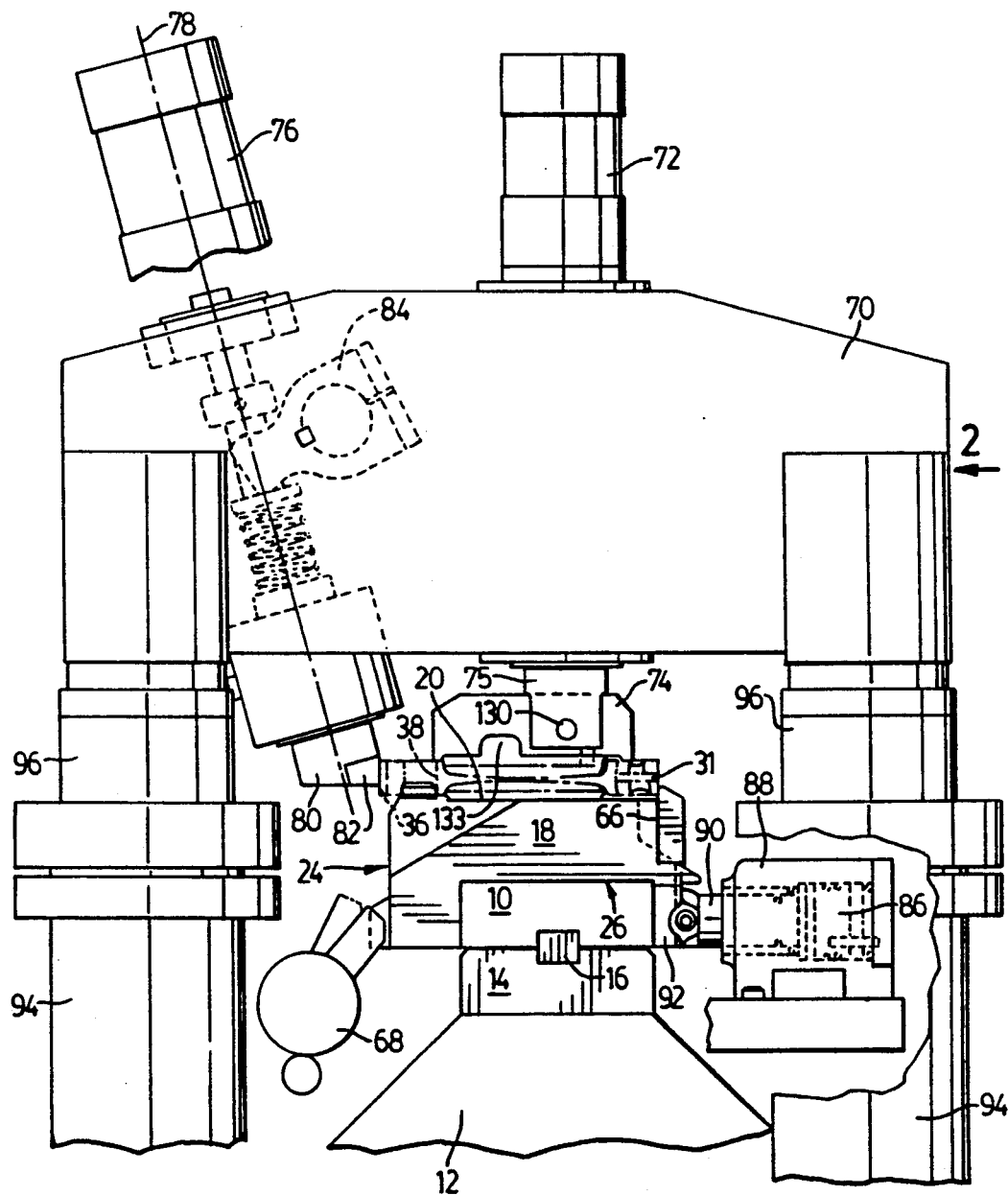
FIG. 1 is a somewhat schematic elevational view of a production machine looking parallel to the direction of movement of the workpiece, and showing six major mechanisms in the complete system.
Figure 2:
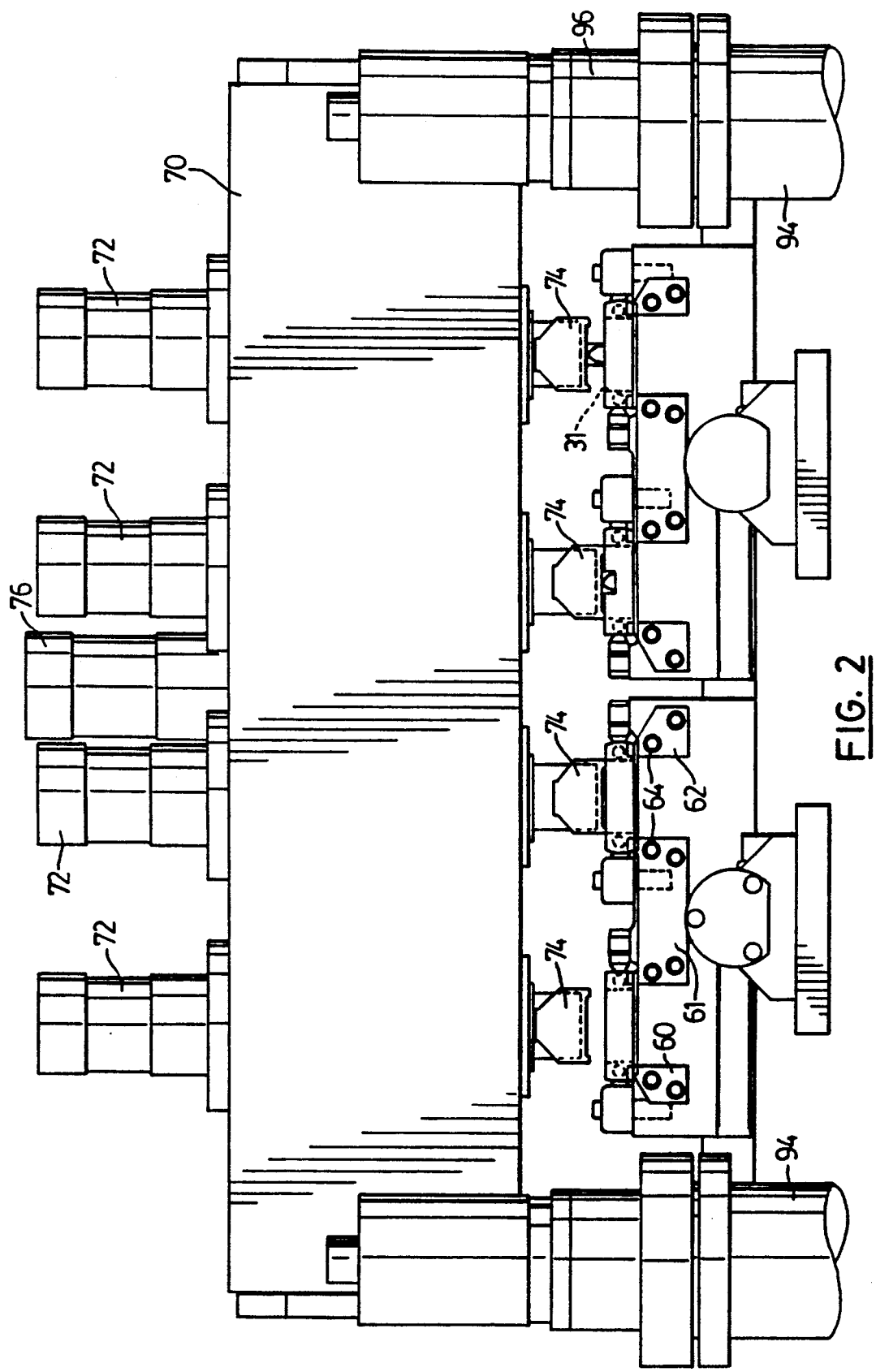
FIG. 2 is a side elevational view looking in the direction of the arrow 2 in FIG. 1.

Attention is first directed to FIG. 1, which illustrates the combination of a workpiece support means and a workstation. The workpiece support means includes an elongate precision way 10 mounted in a fixed position with respect to a machine base 12, the latter defining an upstanding portion 14 to which the precision way 10 is keyed using the key 16.

A transfer fixture 18 is supported on the precision way 10 and is slidable wit respect thereto in the direction at right angles to the drawing sheet, the transfer fixture having an upper surface 20 and vertical end surfaces 22, vertical side surfaces 24, and a bottom surface which is shaped to define a rectangular recess 26 which snugly but slidably receives the precision way 10.

Figure 3A:
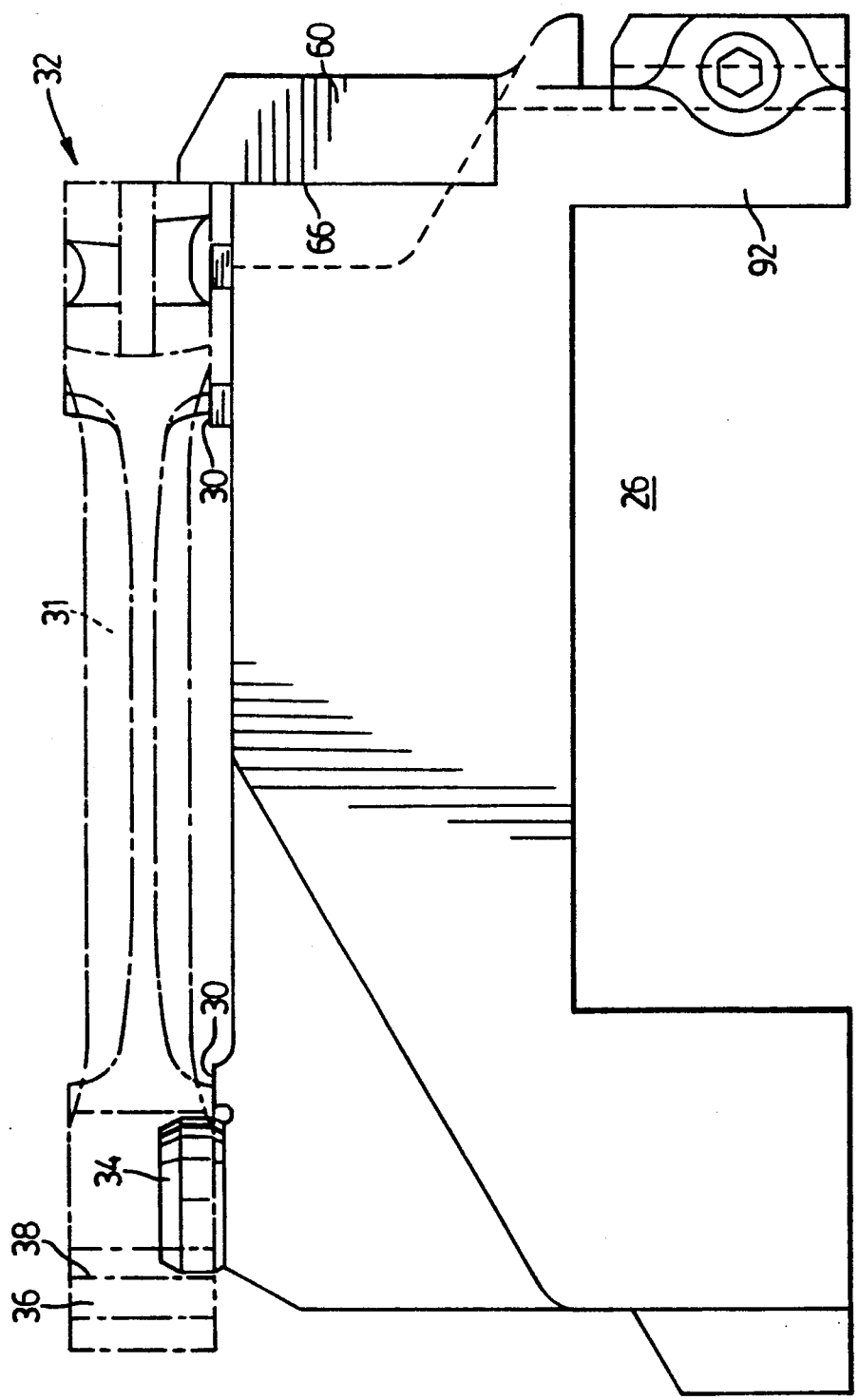
FIG. 3A is an elevational view of the transfer fixture looking in the same direction as for FIG. 1, but to a larger scale.
Figure 3B:
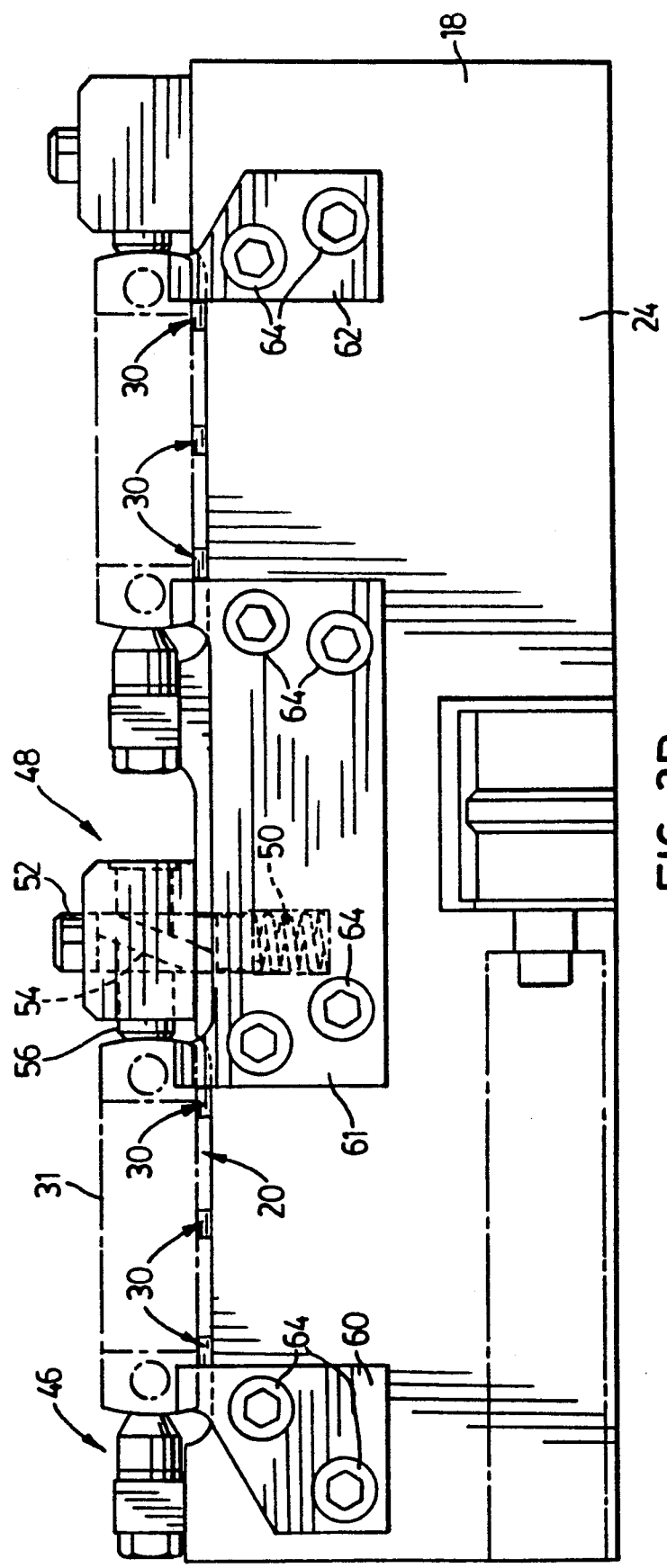
FIG. 3B is a side elevation of the transfer fixture, looking in the same direction as in FIG. 2.
Figure 3C:
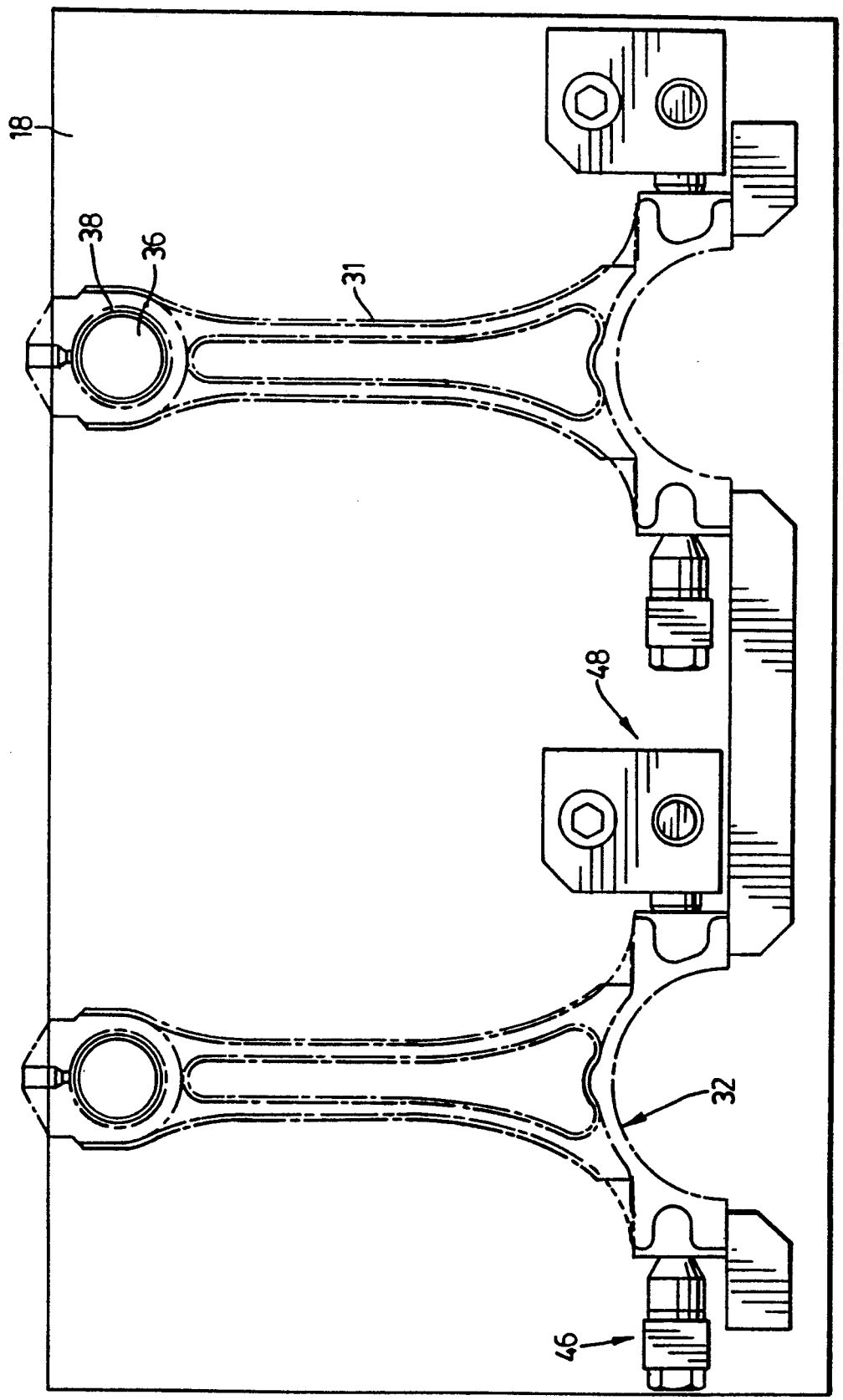
FIG. 3C is a plan view of the transfer fixture shown in FIGS. 3a and 3b.

As best seen in FIG. 3B, the transfer fixture 18 has a plurality of precision-ground datum markets 30 integral with the upper surface 20 and projecting upwardly therefrom. The datum markers 30 are adapted to contact predetermined locations on a workpiece such as the connecting rod 31 (rod end), thus supporting the workpiece at a desired vertical position with respect to the transfer fixture 18. The connecting rod 31 shown in FIG. 3C is seen to include one-half the crankshaft opening at the rightward end (being generally C-shaped), and at the other end a boss 36 defining a bore 38 which receives a piston pin in an engine. In FIG. 3A, an upstanding boss 34 is shown engaging the bore 38.

Also provided for each workpiece, as can be seen in FIG. 3, are a fixed located means 46 and a moveable locator means 48, the locator means 46 and 48 being mounted to the transfer fixture 18.

As can be seen in FIG. 3C, the locator means 46, 48 are generally aligned in a horizontal direction which is parallel with the movement direction for the transfer fixture 18. Moreover, the locator means 46 and 48 are so positioned that they are adapted to clamp the C-shaped portion 32 of a workpiece (rod end of a connecting rod) between them. The moveable locator means 48 is resiliently biased for movement toward the fixed locator means 46, thus permitting the clamping. The resilient biasing comes about by a virtue of a spring 50 seen in FIG. 3B, the spring 50 urging upward a vertical wedge shaft 52 having an oblique cam surface 54 which interacts with a similar surface on a horizontally slidable shaft 56 forming part of the moveable locator means 48.

In operation, the vertical wedge shaft 52 is first depressed manually, thus compressing the spring 50 and pulling the horizontal shaft 56 to the right (as pictured in FIG. 3B), which allows the large end of the workpiece (connecting rod) to be inserted between the fixed locator means 46 and the moveable locator means 48. Once in position, the vertical wedge shaft 52 is released, whereupon it moves upwardly under the force of the spring 50, thus driving the horizontal shaft 56 leftwardly to clamp the workpiece 31 firmly in the desired position.

By the modalities just described, the workpiece 31 is precisely located in two transverse directions: the vertical position of the workpiece 31 is established by the datum locators 30, whereas its horizontal position in the direction of the movement of the transfer fixture is established by the fixed and moveable locator means 46 and 48.

In order to establish the precise position of the workpiece 31 in the direction which is transverse to the two directions just mentioned, namely in the horizontal direction at right angles to the direction of movement of the transfer fixture, the transfer fixture 18 is provided with rails 60, 61 and 62 (see FIG. 3B), which are secured to the longitudinal edge wall 24 of the transfer fixture 18 by threaded fasteners 64. The rails 60, 61 and 62 provide upright surfaces 66 (see FIG.3A) against which the workpiece 31, more specifically the free ends of the C-shaped end portion 32, can be urged, thus establishing for the workpiece 31 a limit position in the horizontal direction which is transverse to the direction of movement of the transfer fixture 18.

Returning now to FIG. 1, the numeral 68 identifies a conventional transfer bar, which constitutes motive means for moving the transfer fixture 18 along the precision way 10.

Also in FIG. 1 there is shown the essential components that form part of the workstation into and out of which the transfer fixture 18 moves along the precision way 10. It is to be understood that FIG. 1 shows only the holding and clamping modalities, and does not show the actual machine tools which perform the various operations on the workpiece. Those skilled in the art will appreciate that for the workpiece described, the machine tools are advanced from right to left as pictured in FIG. 1, for example boring and threading holes in the C-shaped portion 32 of the connecting rod, so that the latter can be fastened to a suitable cap when being mounted to a crankshaft.

It will be appreciated that considerable forces are applied to the workpiece during the machining operations, and that it is necessary to clamp the workpiece very firmly in order to withstand such forces.

Looking at FIG. 1, the workstation includes, in addition to the machine base 12, a bridge fixture 70 which supports, for each workpiece mounted on the transfer fixture, a clamp cylinder 72 having a piston moveable in a vertical direction (no visible in the illustration of FIG. 1), the piston supporting a clamp 74 which is intended to descend into contact with the workpiece and exert downward pressure thereon, thus holding it firmly against the datum locators 30 (see FIG. 3B). The clamp 74 thus constitutes a first clamping means for urging the workpiece downwardly against the datum markers 30.

FIG. 1 also illustrates a second clamping means for urging the workpiece in the horizontal direction transverse to the direction of movement of the transfer fixture, i.e. against the upright surfaces 66 of the various rails 60, 61, 62. Specifically, there is provided a jacking cylinder 76 which is affixed to the bridge fixture 70 at an oblique orientation with respect to the vertical. More specifically, the axis 78 of the jacking cylinder 76 lies in a vertical plane parallel with the plane of the paper in FIG. 1. FIG. 1 thus illustrates the true oblique angle of the jacking cylinder 76. The piston of the jacking cylinder 76 (not illustrated in FIG. 1) moves a bell crank 84 controlling, for each workpiece, a back-up jack 80 having a portion 82 which is machined to present a vertical surface adapted to press rightwardly against the workpiece 31 (see FIG. 1).

In addition to the two clamping mechanisms already described, it is also necessary to clamp the transfer fixture 18 in place against the precision way 10. This is accomplished, as seen in FIG. 1, by a third clamping means constituted by a hydraulic actuator 86 which includes a cylinder housing 88, and a piston 90 which presses leftwardly against a portion 92 of the transfer fixture 18, thus clamping the portion 92 against the way 10.

Still with reference to FIG. 1, it will be seen that the bridge fixture 70 is supported on four hydraulic corner posts 94, each in the form of a hydraulic cylinder secured to the base, having a piston 96 which is attached to the bridge fixture 70.

Figure 4A:
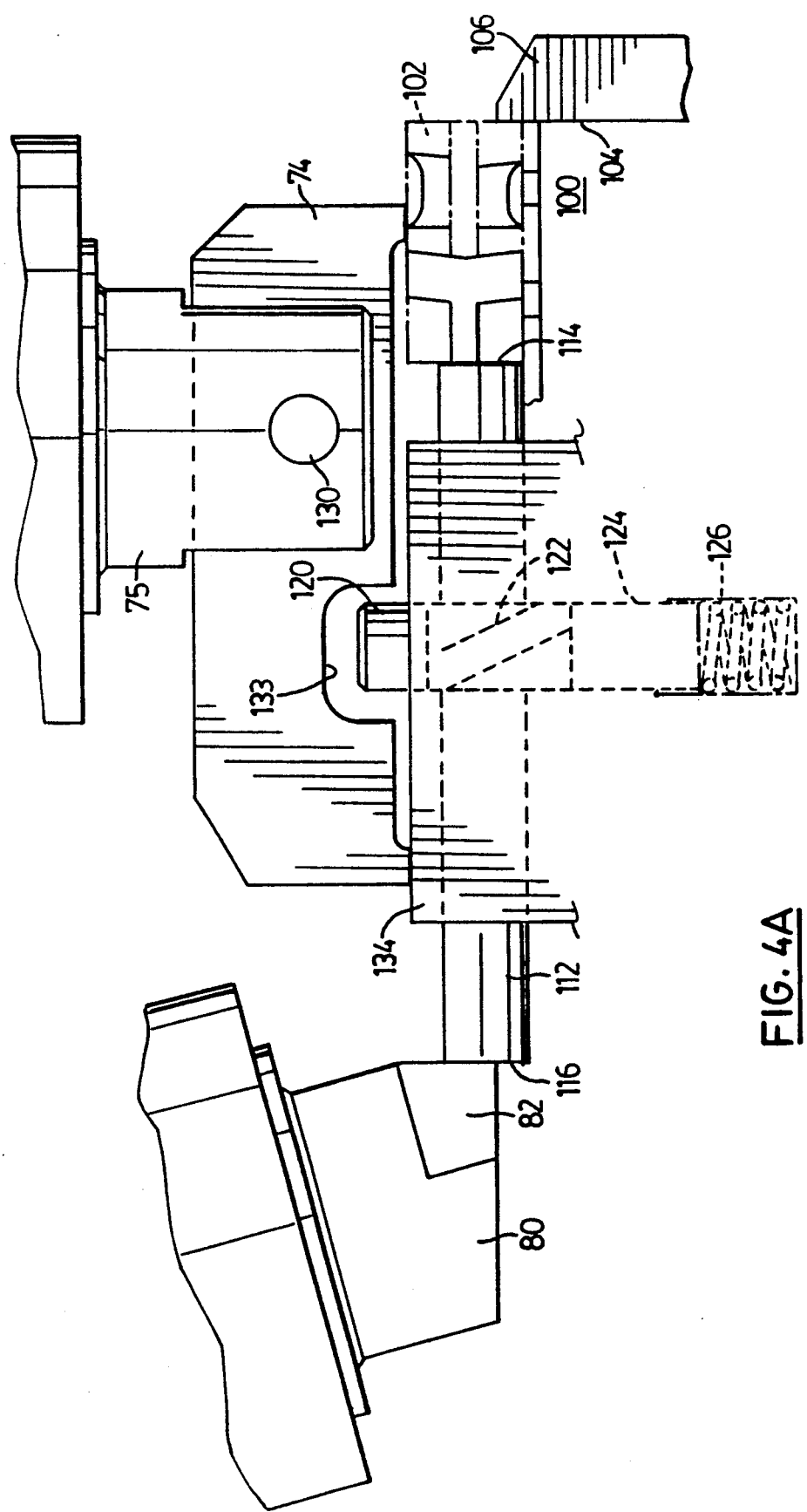
FIGS. 4A, 4B and 4C are partial end elevation, partial plan view and partial side elevation, respectively, of a second embodiment of the transfer fixture suitable for supporting a different part.
Figure 4B:
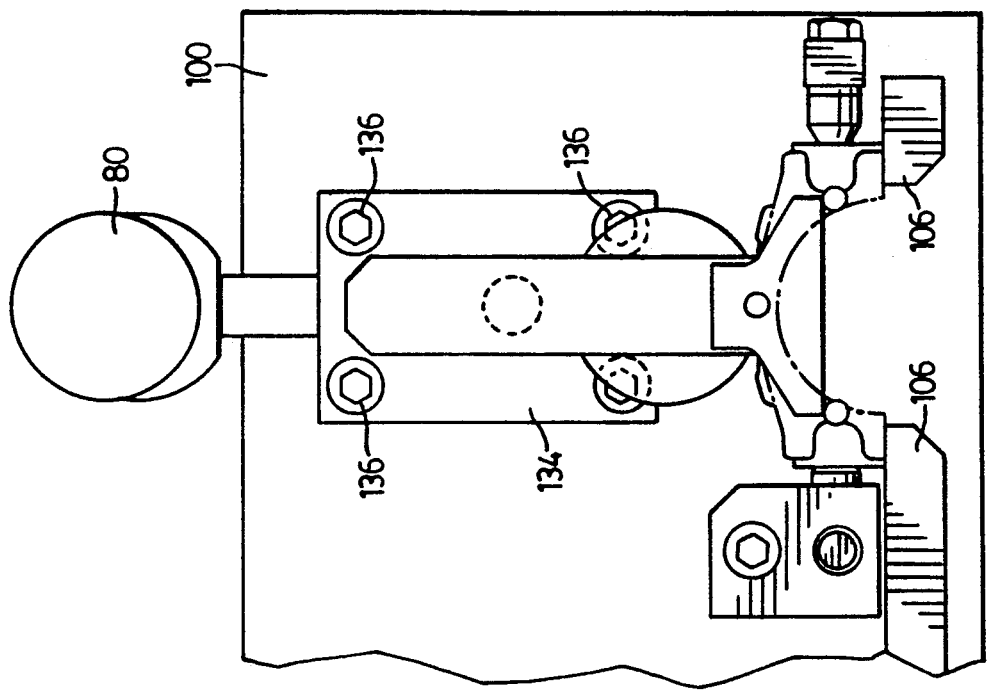
Figure 4C:
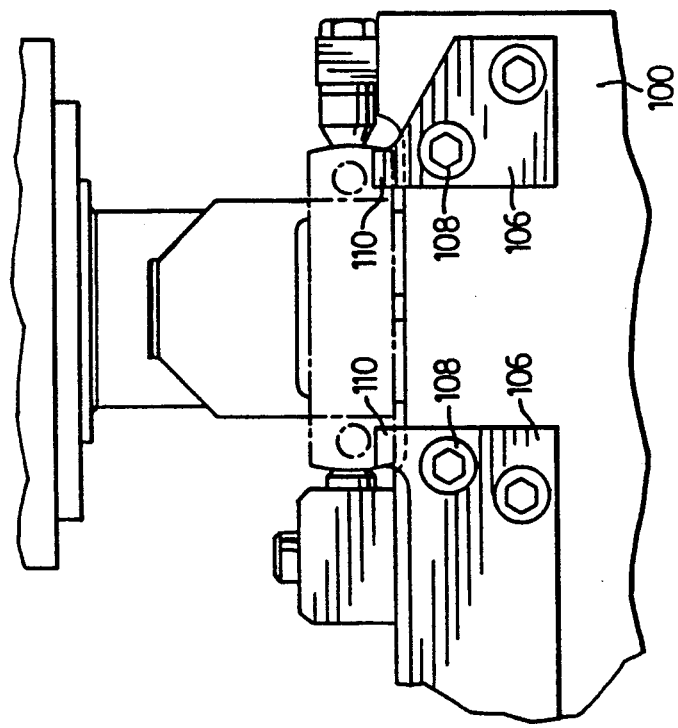

Attention is now directed to FIGS. 4A, 4B and 4C, for a description of the second embodiment of this invention. In the second embodiment, the transfer fixture 100 is adapted to support one or more workpieces in the form of the cap end 102 of a connecting rod for an internal combustion engine, the cap end including one-half of the crank shaft opening.

Looking at FIG. 4A, it will be seen that the workpiece 102 is again urged rightwardly against an upright surface 104 provided by rails 106, the latter being again secured against an upright edge face of the transfer fixture my means of threaded fasteners 108. Of course, the contacted portion of the upright surface of the rails 016 is relatively small (as best seen in FIG. 4C) because it must not interfere with the machining operations. Specifically, the contact portion is identified by the numeral 110 in FIG. 4C.

Turning now to FIG. 4A, the transfer fixture of the second embodiment is provided with a special modality which initially resiliently urges the workpiece 102 rightwardly against the rail 106, and then subsequently is locked in the clamping position by the portion 82 of back-up jack 80, essentially identical with that shown in FIG. 1.

More specifically, the transfer fixture 100 shown in FIG. 4A is provided with a shaft 112 which is mounted for reciprocation in a horizontal direction at right angles to the direction of movement of the transfer fixture 100. The shaft 112 has a rightward end 114 intended to press rightwardly against the workpiece 102, and has a leftward end 116 adapted to be contacted by the portion 82 of the back-up jack 80.

Passing vertically through an opening in the shaft 112 is a wedge shaft 120 which has an oblique cam surface 122 that interacts with a similar oblique surface on the horizontal shaft 112. As can be seen, the wedge shaft 120 is received in an internal, vertical bore 124 in the transfer fixture 100, and a compression coil spring 126 lies in the bottom of the bore 124, urging the vertical wedge shaft 120 upwardly. As the vertical wedge shaft 120 moves upwardly, the cam surface 122 interacts with the shaft 112 to cause the latter to move rightwardly against the workpiece 102. When the back-up jack 80 descends into its intended portion, it press firmly on the horizontal shaft 112, in turn holding the workpiece 102 rigidly against the surface 104 of the appropriate rails 106.

FIGS. 1 and 4A show the clamps as seen in the direction in which the transfer fixture moves. In FIG. 1, the clamp 74 is mounted for limited rotational movement in a vertical plane about a pivot point 130 with respect to the piston 75 of the clamp cylinder 72. The clamp 74 touches the workpiece 31 in two spaced-apart locations, the one being toward the right where the clamp 74 presses downwardly against the C-shaped portion of the connecting rod, the other location being toward the left, where the clamp 74 presses downwardly against the boss 36 defining the bore 38.

It will be noted in FIG. 1 that the clamp 74 has an upward recess 133. This recess performs no function in the FIG. 1 embodiment, but in the FIG. 4A embodiment, the recess 133 accommodates the upwardly projecting end of the vertical wedge shaft 120. In FIG. 4A, the clamp 74 presses downwardly at its rightward end against the cap end workpiece 102, whereas the leftward end of the clamp 74 simply pressing downwardly against a guide member 134 which (as can be seen in FIG. 4B) is secured to the top of the transfer fixture 100 by virtue of threaded fasteners 136.

In operation, one or more workpieces are loaded into the transfer fixture by retracting all spring locator pins at the load station. The transfer bar 18, 100 is then transferred along the precision way 10 to a workstation, pulled by the transfer bar 68. The locator wedge engages the transfer fixture to accurately position the workpieces relative to any tooling. The back-ups and the bridge fixture, namely the clamp 74 and the back-up jack 80, engage the workpieces. Hydraulic clamps, actuated by the bridge fixture, force the workpiece against the transfer fixture, which in turn is forced against the precision way.

One or more machining operations are then carried out, whereupon the back-up jacks and clamps are retracted, freeing the transfer fixture to allow it to be transferred to the next station where further operations can be performed.

At the unload station, the workpieces are taken out of the transfer fixture, and the fixture is returned to the original load station.

The provision of the four hydraulic posts 94 allows the bridge fixture 70 to be raised for maintenance purposes.

While two embodiments of this invention have been illustrated in the accompanying drawings and described hereinabove, it will be evident to those skilled in the art that changes and modifications may be made therein without departing from the essence of this invention, as set forth in the appended claims.

The embodiments of the invention in which an exclusive property or privilege is claimed are defined as follows:

1. For use in positioning a workpiece for machining, the combination of a workpiece support means and a workstation, the workpiece support means comprising:
 a) an elongate precision way mounted in a fixed position,
 b) a transfer fixture supported on and slidable along said precision way, the transfer fixture having an upper surface,
 c) a plurality of precision-ground datum markers integral with and projecting upwardly from said surface, the datum markers being adapted to contact predetermined locations on said workpiece, thus supporting the workpiece at a desired vertical position with respect to the transfer fixture,
 d) rail means fixed with respect to the transfer fixture, the rail means providing upright surfaces against which the workpiece can be urged, thus establishing for the workpiece a limit position in one horizontal direction,
 e) a fixed locator means and a movable locator means, the two locator means being mounted to said transfer fixture and being generally aligned in a horizontal direction perpendicular to said one horizontal direction, the movable locator means being resiliently biased toward the fixed locator means, the two locator means being adapted to clamp the workpiece between them with the movable locator means urging the workpiece against the fixed locator means,
 f) and motive means for moving the transfer fixture along the precision way;

the workstation comprising:
 g) first clamping means for urging the workpiece downwardly against said datum markers,
 h) second clamping means for urging the workpiece in said one horizontal direction against the upright surfaces of said rail means, and
 i) third clamping means for clamping the transfer fixture against said precision way.

2. The combination claimed in claim 1, in which said motive means includes a reciprocating transfer bar along with means for engaging and disengaging said transfer fixture.

3. The combination claimed in claim 1, in which said first, second and third clamping means are hydraulically actuated.

4. The combination claimed in claim 1, in which the workpiece is the rod end of a connecting rod for an internal combustion engine, the rod end including one-half the crankshaft opening and a bore for a piston pin, the workpiece support means further comprising a rough locator in the form of an upstanding boss sized to receive said bore.

5. The combination claimed in claim 4, in which the datum markers for the workpiece include one datum marker adjacent said upstanding boss, and two additional datum markers to provide a total of three points defining a horizontal plane upon which the workpiece is clamped.

6. The combination claimed in claim 5, in which said second clamping means includes an obliquely oriented cylinder with an axially movable piston, the latter supporting a back-up jack adapted to contact the workpiece remote from the crankshaft opening and urge the same in said one horizontal direction toward and against said upright surfaces; in which said motive means includes a reciprocating transfer bar along with means for engaging and disengaging said transfer fixture; and in which said first, second and third clamping means are hydraulically actuated.

7. The combination claimed in claim 4, in which said second clamping means includes an obliquely oriented cylinder with an axially movable piston, the latter supporting a back-up jack adapted to contact the workpiece remote from the crankshaft opening and urge the same in said one horizontal direction toward and against said upright surfaces.

8. The combination claimed in claim 1, in which the workpiece is the cap end of a connecting rod for an internal combustion engine, the cap end including one-half the crankshaft opening, said second clamping means including an obliquely oriented cylinder with an axially movable piston, the latter supporting a back-up jack, the second clamping means further including a horizontally movable shaft member mounted on said transfer fixture for reciprocation with respect thereto in said one horizontal direction, the shaft member having a first end adapted to contact the workpiece and a second end adapted to be contacted by said back-up jack in order to urge said cap end in said one horizontal direction toward and against said upright surfaces.

9. The combination claimed in claim 8, in which the workstation further comprises machine tool means for performing at least one machining operation on said workpiece; in which the workstation further comprises a base, said precision way being fixed with respect to said base, a bridge fixture positioned above the precision way, and hydraulic support means for controlling the position of said bridge fixture with respect to said base, said first and second clamping means being mounted to said bridge fixture, said first clamping means being mounted to said base; in which said motive means includes a reciprocating transfer bar along with means for engaging and disengaging said transfer fixture; and in which said first, second and third clamping means are hydraulically actuated.

10. The combination claimed in claim 1, in which the workstation further comprises machine tool means for performing at least one machining operation on said workpiece.

11. The combination claimed in claim 1, in which the workstation further comprises a base, said precision way being fixed with respect to said base, a bridge fixture positioned above the precision way, and hydraulic support means for controlling the position of said bridge fixture with respect to said base, said first and second clamping means being mounted to said bridge fixture, said first clamping means being mounted to said base.

12. A method of positioning a workpiece for machining, the method including the steps:
A. providing a workpiece support means comprising:

a) an elongate precision way mounted in a fixed position,
b) a transfer fixture supported on an slidable along said precision way, the transfer fixture having an upper surface,
c) a plurality of precision-ground datum markers integral with and projecting upwardly from said surface, the datum markers being adapted to contact predetermined locations on said workpiece, thus supporting the workpiece at a desired vertical position with respect to the transfer fixture,
d) rail means fixed with respect to the transfer fixture, the rail means providing upright surfaces against which the workpiece can be urged, thus establishing for the workpiece a limit position in one horizontal direction,
e) a fixed locator means and a movable locator means, the two locator means being mounted to said transfer fixture and being generally aligned in a horizontal direction perpendicular to said one horizontal direction, the movable locator means being resiliently biased toward the fixed locator means, the two locator means being adapted to clamp the workpiece between them with the movable locator means urging the workpiece against the fixed locator means,
f) and motive means for moving the transfer fixture along the precision way;
B. providing a workstation comprising:
g) first clamping means for urging the workpiece downwardly against said datum markers,
h) second clamping means for urging the workpiece in said one horizontal direction against the upright surfaces of said rail means, and
i) third clamping means for clamping the transfer fixture against said precision way;
C. placing the workpiece on the transfer fixture so that it rests on said datum markers and against said upright surfaces,
D. using the movable and the fixed locator means to position the workpiece in the horizontal direction perpendicular to said one horizontal direction,
E. moving the transfer fixture along said precision way until it reaches a predetermined position with respect to the workstation,
F. clamping the transfer fixture against the precision way using said third clamping means,
and then, in any order,
G. urging the workpiece against said upright surfaces using said second clamping means, and
H. urging the workpiece downwardly against said datum markers using said first clamping means.

* * * * *